US007466455B2

(12) United States Patent
Boesten et al.

(10) Patent No.: US 7,466,455 B2
(45) Date of Patent: Dec. 16, 2008

(54) IMAGE PROCESSING METHOD AND SYSTEM FOR PERFORMING MONOCHROME/COLOR JUDGEMENT OF A PIXELISED IMAGE

(75) Inventors: Hubertus M. J. M. Boesten, Melick (NL); Peter M. Van Der Sanden, Baarlo (NL)

(73) Assignee: Oce-Technologies B.V., Venlo (NL)

( * ) Notice: Subject to any disclaimer, the term of this patent is extended or adjusted under 35 U.S.C. 154(b) by 827 days.

(21) Appl. No.: 10/720,443

(22) Filed: Nov. 25, 2003

(65) Prior Publication Data
US 2004/0105582 A1    Jun. 3, 2004

(30) Foreign Application Priority Data
Nov. 27, 2002   (EP)   .................................. 02079957

(51) Int. Cl.
   *G06K 15/00*   (2006.01)
(52) U.S. Cl. ..................... 358/3.21; 358/3.01; 358/522; 358/453; 358/462; 358/465; 382/171; 382/172; 382/165
(58) Field of Classification Search ................ 358/3.21, 358/3.01, 462, 453, 465, 522, 539; 382/170, 382/171, 172, 165
See application file for complete search history.

(56) References Cited

U.S. PATENT DOCUMENTS

| 624,592 | A | * | 5/1899 | Whitney | 55/405 |
|---|---|---|---|---|---|
| 5,721,628 | A | * | 2/1998 | Takaragi et al. | 358/518 |
| 5,722,440 | A | * | 3/1998 | Urso | 132/323 |
| 5,786,906 | A | * | 7/1998 | Shishizuka | 358/500 |
| 6,240,203 | B1 | * | 5/2001 | Kawano et al. | 382/164 |
| 6,504,628 | B1 | * | 1/2003 | Kanno et al. | 358/522 |
| 6,898,316 | B2 | * | 5/2005 | Zhou | 382/190 |
| 6,972,866 | B1 | * | 12/2005 | Bares et al. | 358/1.9 |
| 7,116,443 | B2 | * | 10/2006 | Handley et al. | 358/1.9 |
| 2001/0051001 | A1 | * | 12/2001 | Nakamura et al. | 382/154 |
| 2002/0019861 | A1 |  | 2/2002 | Sakamoto |  |
| 2002/0075491 | A1 | * | 6/2002 | Bares | 358/1.9 |
| 2002/0102013 | A1 | * | 8/2002 | Smilansky | 382/129 |
| 2003/0215133 | A1 | * | 11/2003 | Gindele et al. | 382/167 |
| 2004/0042664 | A1 | * | 3/2004 | Van Hall et al. | 382/224 |

FOREIGN PATENT DOCUMENTS

| EP | 0 363 146 A2 | 4/1990 |
|---|---|---|
| EP | 0 448 330 A1 | 9/1991 |
| EP | 0 724 229 A2 | 7/1996 |
| EP | 0 967 791 A2 | 12/1999 |
| EP | 1 148 711 A1 | 10/2001 |
| JP | 3-270383 A | 12/1991 |
| JP | 11-317880 | 11/1999 |

* cited by examiner

*Primary Examiner*—Twyler L. Haskins
*Assistant Examiner*—Jacky X Zheng
(74) *Attorney, Agent, or Firm*—Birch, Stewart, Kolasch & Birch, LLP (57) ABSTRACT

An image processing system and method are provided for judging whether a pixelised image or a part thereof is a monochrome or a color image. To increase the reliability of the judgement, instead of making the judgement on the level of an individual pixel, the judgement is made for substantially all the pixels of the image or image part at the same time by analyzing the cumulative histogram, wherein the distance of each pixel to the gray axis versus the logarithm of the cumulative pixel count is plotted. An advantage of the present system and the method of operating this system is their high sensitivity for detecting small color objects in monochrome images.

19 Claims, 6 Drawing Sheets

IMAGE PROCESSING METHOD AND SYSTEM FOR PERFORMING MONOCHROME/COLOR JUDGEMENT OF A PIXELISED IMAGE

This non-provisional application claims priority under 35 U.S.C. § 119 on Patent Application No. 02079957.3 filed in Europe on Nov. 27, 2002, which is herein incorporated by reference.

BACKGROUND OF THE INVENTION

1. Field of the Invention

The present invention is related to the image processing of pixelised images, more particularly to the judgement whether a pixelised image is a monochrome or a color image. The image processing system may be a stand-alone system or may be part of a scanning and/or image recording and/or printing and/or copying system.

2. Discussion of the Related Art

A pixelised image is a digital image or document composed of pixels (picture elements). There are numerous ways to generate a pixelised image such as for instance, by scanning an original image or document using a scanner, or by generating still images using a digital camera or a video camera. Besides the pixelised images generated by a scanner or a digital camera, which are usually in a bitmap format or a compressed bitmap format, also artificially created, e.g. by a computer program, digital images or documents may be offered to the image processing system. The latter images are usually in a structured format including but not limited to a page description language (PDL) format and an extensible markup language (XML) format. Examples of a PDL format are PDF (Adobe), PostScript (Adobe), and PCL (Hewlett-Packard). These structured images can easily be converted by a raster image processor into pixelised images.

The pixelised images may comprise color data including color image data, color errors, e.g., introduced by scanning a black and white original with a color scanner, or color background data, e.g., when scanning an original image printed on a colored background with a color scanner.

For each pixelised image, or parts thereof, the image processing system has to judge whether it is a monochrome image or a color image. The reliability and quality of this judgement is important for many reasons related to the subsequent processing of the image. One of these reasons is for instance image processing time and memory allocation, particularly when storing the pixelised image. When a monochrome image is misjudged as a color image, the processing time and storage capacity required is considerably larger compared to storing the image when being judged as a monochrome image. Another reason can be image quality when reproducing the image. For example when a monochrome original is scanned by a color scanner, recognition of the pixelised image as a color image and subsequent reproduction thereof by a color image forming system could result in a severe image quality degradation due to, e.g., registering errors. Systems used to reproduce pixelised images include display systems, scanning systems and printing and/or copying systems. A further reason can be throughput and cost as image reproduction on a monochrome image reproduction system is usually cheaper and faster compared to reproduction on a color reproduction system. Particularly in a professional environment such as e.g. the repro department of a company or a print and/or copy shop, where multiple image reproduction systems are available, including a color image reproduction system and a black and white image reproduction system and/or a color image reproduction system capable of operating in a "black only" mode, it is desirable to make optimal use of the resources in order to optimize throughput and costs. Also for the reproduction of a mixed color image, being an image or a document comprising both colored and non-colored parts, it may be beneficial to split the mixed color image into a color part and a monochrome part.

Image processing systems are known, as for instance disclosed in European Patent Application Publication No. EP363146. Such systems are able to split mixed color images on page level into a color part and a monochrome part. The color part contains all the pages of the mixed color image with color information. The monochrome part contains all the pages of the mixed color image with black and white information only. Subsequently, the respective parts are processed by a color image reproduction system and a black and white image reproduction system respectively. The sole criterion to judge whether a page is to be classified as a color page or not is the bare presence of some color information.

More advanced algorithms could be used to provide the operator and/or user with the possibility to define a threshold in the color content, i.e., the amount of color information present on an image page, or image part or image. If the amount of color is below the color threshold, the image is subsequently treated as a monochrome image, even although it may contain a limited amount of color information, e.g., a colored line or bullet.

An image processing system disclosed in European Patent Application Publication No. EP 0 448 330 firstly converts the image data of the pixelised image to a CIE color space. EP 0 448 330 contains embodiments wherein the saturation value of each individual pixel is compared to a first threshold in order to judge whether it is a color pixel or not. The color pixels are counted and compared with a second threshold in order to judge whether the image is a color image or not. Although this solution may definitely have some merit, a disadvantage thereof is that the color judgement is performed on individual pixels and is inherently sensitive to color errors, e.g., pixels having a saturation value different from the original due to a scan read and/or calibration error. EP 0 448 330 further discloses to perform the color judgement in accordance with a frequency distribution of saturation information of each pixel. In particular, pixels having a saturation value with a high occurrence in the image are decisive in the color judgement. But a disadvantage of this disclosed method is its lack of sensitivity when judging images having a limited amount of color, in other words images comprising only color pixels having a saturation value with a low occurrence in the image.

SUMMARY OF THE INVENTION

It is an object of the invention to provide an image processing system and method capable of judging whether a pixelised image or a part thereof is a monochrome or a color image. To increase the reliability of the judgement, instead of making the judgement on the level of an individual pixel, the judgement should be performed for substantially all the pixels of the image or image part at the same time.

It is another object of the invention to provide an image processing system and method capable of performing the monochrome/color judgement for a pixelised image with a high sensitivity, such that color pixels having a saturation value with a low occurrence are properly taken into account. Preferably the judgement is performed in an automated way.

It is a further object of the invention to provide an image processing system and method capable of performing the monochrome/color judgement for a pixelised image independent of the color space whereto the image data of the pixelised image are referring.

In an aspect of the invention, there is provided an image processing method for processing a pixelised image, the method comprising the steps of: analyzing pixel data representative of the pixelised image in a color space and based thereon determining a gray axis, defined as a straight line connecting a white point with a black point; determining for each pixel of the pixelised image the shortest distance to the gray axis; forming a cumulative histogram by plotting for the pixels of the pixelised image a value of the shortest distance versus a cumulative pixel count being the number of associated pixels having at least the value of the shortest distance; and analyzing a relationship between the pixels in the cumulative histogram and based thereon judging whether the pixelised image is to be processed as a monochrome image or a color image.

The gray axis is defined as the straight line connecting the white point with the black point. The co-ordinates of the black point and the white point depend on the color space whereto the pixel data refer. The black point may be the ideal black point and the white point may be the ideal white point. Alternately, the cluster of the darkest pixels, being those pixels of the pixelised image with lack of lightness and lowest chromaticity, may be taken into account to determine the black point, e.g., by defining the black point as the pixel with the average value of luminance of said cluster of darkest pixels, while the lightest pixels may be taken into account to determine the white point. One could also opt to define the black point as that pixel of the pixelised image which is located closest to the ideal black point, while defining the white point as that pixel of the pixelised image which is located closest to the ideal white point. Other known methods may be equally applied to determine the black point and/or the white point.

In an embodiment of the invention, when analyzing the relationship between the pixels in the cumulative histogram, only the pixels of the cumulative histogram having an associated cumulative pixel count value equal to or greater than a predetermined threshold are taken into account. Doing so allows the system to decide whether to take small color objects into account or not in the monochrome/color judgement by selecting an appropriate threshold.

In another embodiment of the invention, the relationship between the pixels in the cumulative histogram is determined in an automated way by applying a linear regression analysis to the pixels in said cumulative histogram. When analyzing whether the pixelised image is to be processed as a monochrome image or a color image, the judgement is based on comparing the value of at least one regression parameter with a predetermined threshold value of said at least one regression parameter. The regression parameters are selected from a group of parameters comprising the correlation coefficient (R), the coefficient of determination ($R^2$), the slope of the regression line and the intercept of the regression line.

In another aspect of the invention, there is provided an image processing system for processing a pixelised image, the system comprising: a pre-processor for analyzing pixel data representative of the pixelised image in a color space and based thereon determining a gray axis, defined as a straight line connecting a white point with a black point, and determining for each pixel of the pixelised image the shortest distance to the gray axis; an analyzer for analyzing a relationship between the pixels of the pixelised image in a cumulative histogram, the cumulative histogram being formed by plotting for the pixels of the pixelised image a value of the shortest distance versus a cumulative pixel count being the number of associated pixels having at least the value of the shortest distance; and a judging unit for judging, based on the relationship between the pixels in the cumulative histogram, whether the pixelised image is to be processed as a monochrome image or a color image.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

In relation to the appended drawings, the present invention is described in detail in the sequel. Several embodiments are disclosed. It is apparent however that a person skilled in the art can imagine other equivalent embodiments or other ways of executing the present invention, the scope of the present invention being limited only by the terms of the appended claims.

Figure 1:
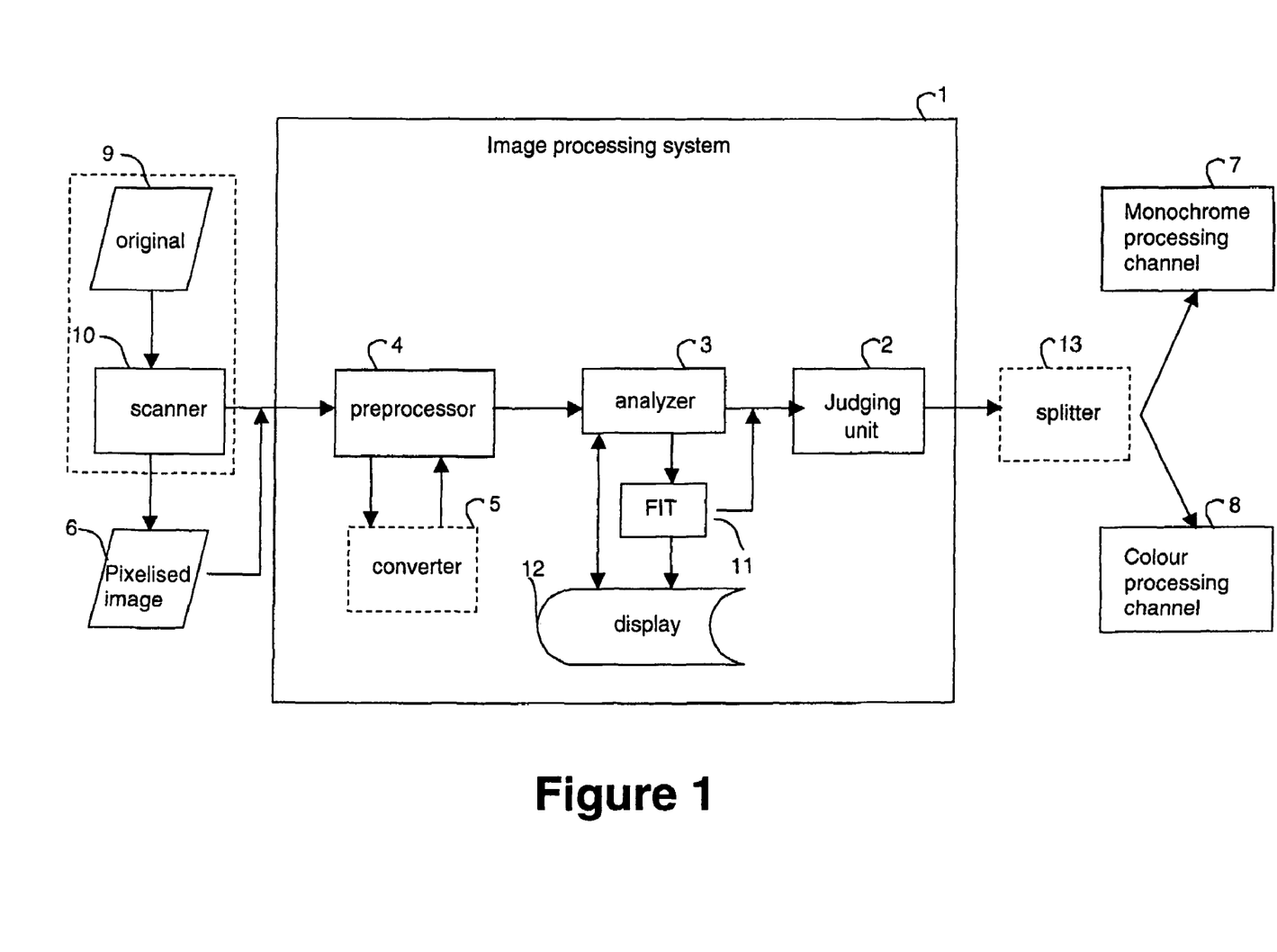
FIG. 1 depicts a schematic representation of an image processing system for processing pixelised images according to an embodiment of the invention.

According to a preferred embodiment of the present invention, the image processing system (1), as schematically depicted in FIG. 1, comprises a pre-processor (4), an analyzer (3), a judging unit (2) and optionally a converter (5). The image processing system (1) may be incorporated in a computer, which may be coupled by a network or any other interface to one or more image reproduction systems. The image processing system (1) may also be part of an image reproduction system. Examples of image reproduction systems are display systems, scanning systems, image recording systems and printing and/or copying systems. All the components of the image processing system (1) are operatively coupled.

Any pixelised image (6) may be offered to the pre-processor (4) of the image processing system. However, as indicated in FIG. 1, the pixelised image (6) may be generated by scanning an original image or document (9) using a color scanner (10). The size of the pixels depends on the optical resolution of the illumination device. The generated pixelised images are composed of a number of color separation images dependent on the color space used, in case of scanned images typically the sRGB color space is used. Therefore, these generated pixelised images are composed of three separation images respectively of the process colors red (R), green (G) and blue (B). The image signals associated with the separation images typically specify for each pixel an image density value using a 24-bit representation, i.e. 8-bits per process color. A 8-bit representation enables to define 256 levels per process color each corresponding with a particular tonal value. Optionally the converter (5) may convert the image signals of the sRGB color space associated with the pixelised image to image signals of a different color space. Of particular interest are the device independent color spaces of the CIE ("Commission Internationale d'Eclairage"), such as e.g., the XYZ color space, the xyY color space, the L*a*b* color space and the L*u*v* color space.

Thereafter the pre-processor (4) enables to pre-process the image signals, e.g., to correct color errors, and determines the gray axis. The analyzer (3) calculates for each pixel of the pixelised image the shortest distance to the gray axis and keeps track of the cumulative pixel count being the number of pixels associated with a particular distance to the gray axis, namely all the pixels having a shortest distance value to the gray axis of at least said particular distance. For all pixels, the logarithm of the cumulative pixel count versus the distance to the gray axis is plotted on a display (12) for further analysis. When the pixelised image represents a monochrome image, a linear relationship between the logarithm of the cumulative pixel count and the distance to the gray axis is expected irrespective of the color space used. The analysis of the plot can be facilitated by employing a fitting routine (11). The fitting routine (11) analyzes the pixels using a linear regression analysis. The obtained regression line can be displayed together with the pixel data using the display (12).

Based on the analysis data and optionally on the values of the regression parameters, the judging unit (2) decides whether the pixelised image (or part thereof) is a monochrome image or a color image. The judging unit (2) may mark the pixelised image accordingly for further processing in either a monochrome processing channel (7) or a color processing channel (8). Optionally, a converter may be provided (not shown) to convert the image signals associated with the pixelised image. For instance, in case the pixelised image is judged to be in color, the associated image signals may be converted to another color space, e.g., a color space associated with the process color of the color processing channel, while in case the pixelised image is judged to be in monochrome, the associated image signals may be converted into a monochrome image signal.

An example of a color processing channel is a color image reproduction system. An example of a monochrome processing channel is a monochrome image reproduction system, including a color image reproduction system capable of operating in a monochrome mode. The dual processing channel configuration according to the present invention may also be applied for the archiving of the pixelised images where in the respective processing channels different compression techniques are employed to process and store pixelised images or parts thereof.

Optionally, when the pixelised image is a mixed color/monochrome image, one may opt to split the image using a splitter (13) into a monochrome part and a color part. The monochrome part comprises all the image parts being judged as monochrome and/or marked to be further processed in a monochrome processing channel. The color part comprises all the image parts being judged as color and/or marked to be further processed in a color processing channel.

Figure 2:
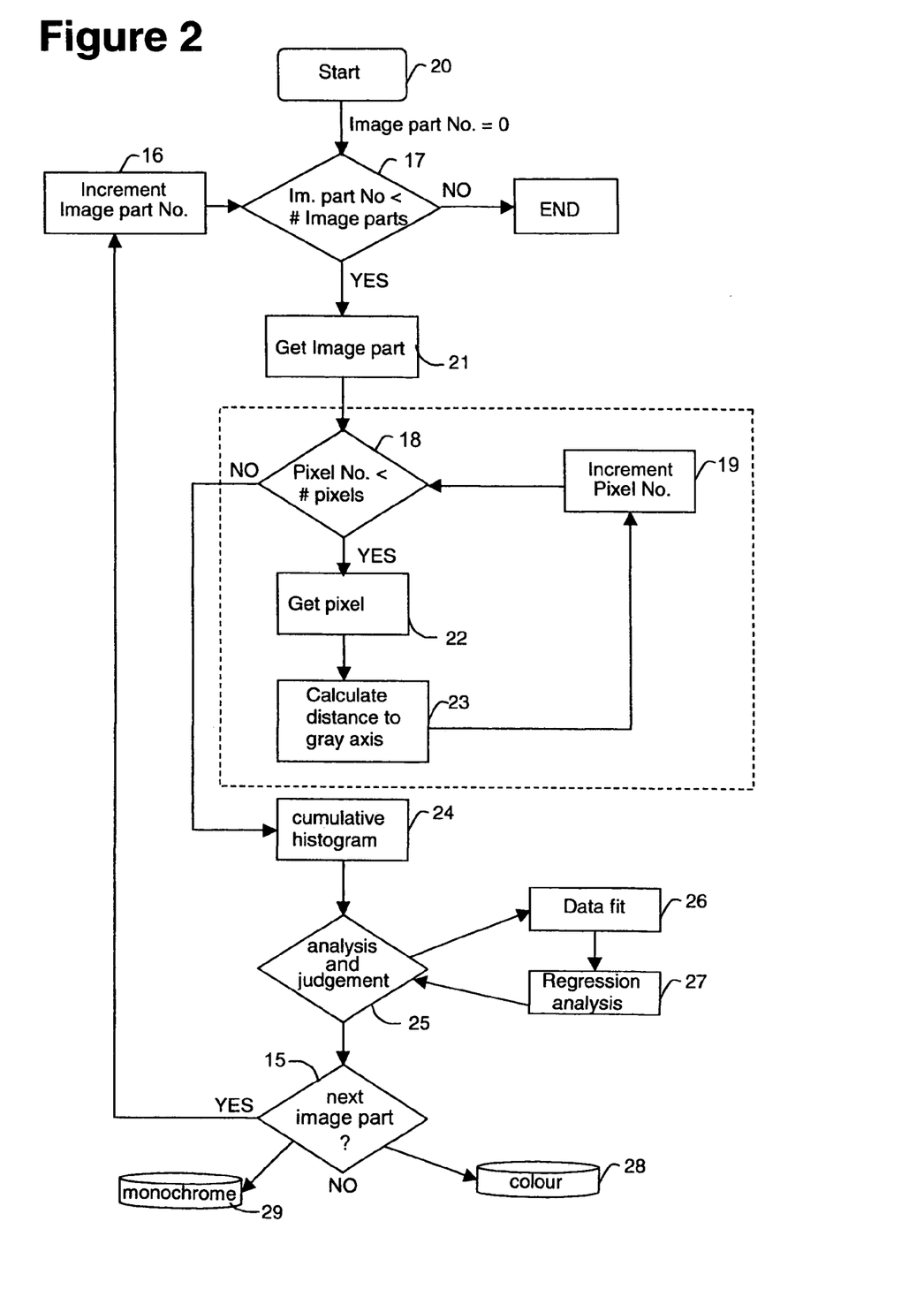
FIG. 2 depicts a flowchart for operating an image processing system as e.g., depicted in FIG. 1 so as to judge whether a pixelised image is to be further processed as a monochrome or a color image according to an embodiment of the invention.

When operating an image processing system such as the system of FIG. 1 according to the present invention, a process flow as schematically depicted in FIG. 2 may be executed. Referring to FIG. 2, at start (20), at least the first image part (21) of a pixelised image is retrieved by the pre-processor (4) of the image processing system. The pre-processor (4) determines the color space associated with the part of the pixelised image. Optionally, the image signals associated with the pixelised image may be converted to another color space, preferably a device-independent color space of the CIE.

Once the color space is established, the gray axis is determined. The gray axis is defined as the straight line connecting the white point with the black point. The ideal black point and the ideal white point may be taken. For example in a RGB color space, using a 24-bit representation, the ideal black point is referred to as (0,0,0), while the ideal white point is (255, 255, 255). In the CIE L*a*b* color space, the ideal gray axis coincides with the luminance (lightness) axis, i.e., the achromatic colors or in other words a*=0 and b*=0. The ideal black point in L*a*b* is referred to as (0,0,0), while the ideal white point is referred to as (100,0,0) using a lightness scale from 0 to 100. In practice, however, in order to compensate for color errors and/or background color, the black point and/or white point may be determined otherwise. For instance, the cluster with the darkest pixels (lack of lightness) and lowest chromaticity of the pixelised image may be taken into account to determine the black point, while the lightest pixels may be taken into account to determine the white point.

Once the equation of the gray axis is established, the image data of each individual pixel (22) of the pixelised image is retrieved and for each pixel the shortest distance to the gray axis is calculated (23, 19 and 18). If all the pixels have been processed to calculate the shortest distance to the gray axis, then a cumulative histogram (24) is formed wherein, for all pixels, the logarithm of the cumulative pixel count versus the distance to the gray axis is plotted. Plotting the logarithm of the cumulative pixel count attributes significant weight to a small number of pixels at a large distance from the gray axis or in other words pixels with a high chromaticity. This renders the system of the present invention highly sensitive such that small amounts of color can be recognized. Subsequently the cumulative histogram is analyzed and based thereon a judgement (25) is made whether the processed image part is in monochrome or color. Thereafter the next image part, if any, may be retrieved and the whole process flow can be repeated until all the image parts are processed (15, 16 and 17).

The data analysis (25) can be supplemented and the subsequent judgement may be facilitated by fitting the data (26). Preferably the data are fitted employing a linear regression method. A regression analysis (27) is performed by selecting at least one regression parameter and comparing it with a predetermined value to make the color (28)/monochrome (29) judgement. Examples of regression parameters which may be useful in the analysis are the correlation coefficient (R), the coefficient of determination ($R^2$), the slope of the regression line and the intercept of the regression line.

When performing the color/monochrome judgement according to the present invention, a color threshold can be taken into account. For instance, suppose an image comprising a color object which is 0.01% or less of the image or image part is not to be considered as a color image. According to the present invention a cut-off value for the cumulative pixel count can be defined in the cumulative histogram such that 99.99% percent of the pixels are taken into account in the analysis (25) and data fit (26), while the 0.01% of the pixels having the highest chromaticity values are excluded.

Different examples of judging whether a pixelised image is a monchrome or color according to the present invention are now provided below.

EXAMPLE 1

Figure 3A:
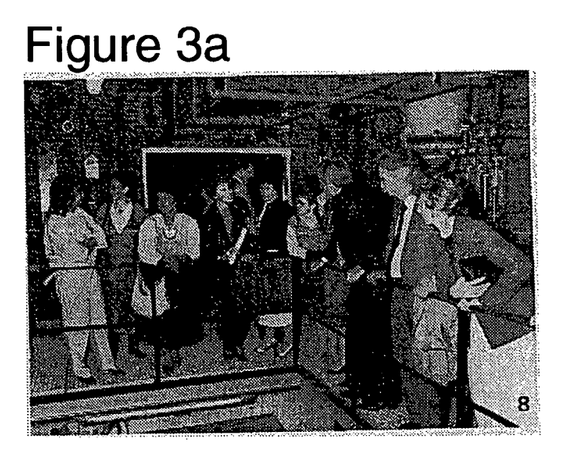
FIG. 3a is an example of a monochrome photograph.
Figure 3B:
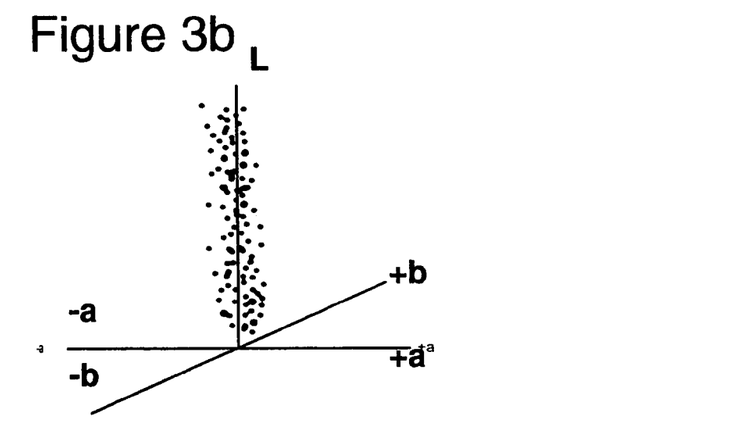
FIG. 3b is a representation of the pixelised photograph of FIG. 3a in the CIE L*a*b* color space.

An original, such as a monochrome photograph, as depicted in FIG. 3a, is scanned using a color scanner. As a result a pixelised image is obtained which is used as input for the pre-processor (4) of the image processing system according to the present invention. The pixelised image is composed of color separation images in the RGB color space. The image signals associated with the respective separation images are converted to image signals associated with the CIE L*a*b* color space. An advantage of the CIE L*a*b* color space is that color is represented as perceived by the human eye. In FIG. 3b, all pixels of FIG. 3a are represented in the CIE L*a*b* color space.

Figure 3C:
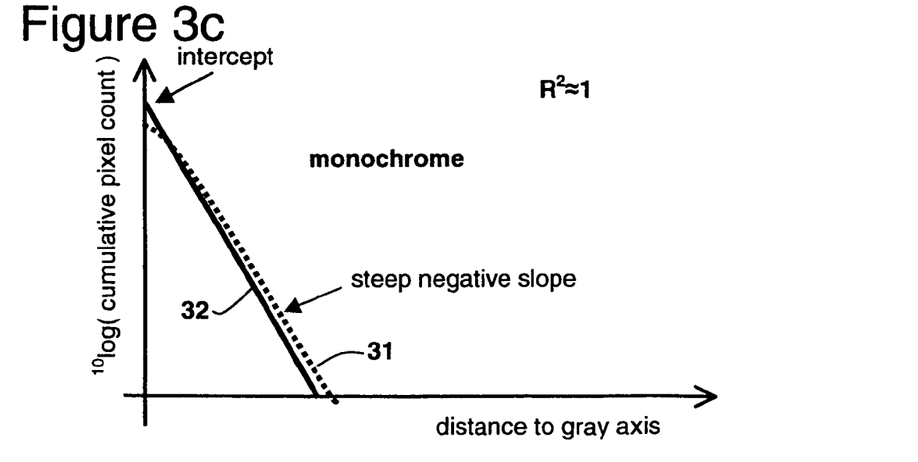
FIG. 3c is a cumulative histogram of the pixelised photograph of FIG. 3a according to an embodiment of the invention.

To determine the gray axis, the ideal black point (0,0,0) and the ideal white point (100,0,0) are taken or in other words the gray axis coincides with the luminance axis. Subsequently the analyzer (3) can calculate for each pixel the shortest distance to the gray axis. For all pixels, the logarithm of the cumulative pixel count (31) versus the distance to the gray axis is subsequently plotted in the cumulative histogram as depicted in FIG. 3c. As can be seen in this cumulative histogram, the relationship depicted by the curve (31) is a linear one, as expected for a monochrome image. Thus, the pixelised image is judged to be a monochrome image. This is confirmed by the linear regression analysis yielding a regression curve (32) with a coefficient of determination ($R^2$) equal to 0.996 ($R^2=1$ means a perfect straight line). As can be expected, the slope of the regression line is very steep while the value of the intercept is high. These are all indications that the image is a monochrome pixelised image.

The operator or may perform the color/monochrome judgement himself and process the pixelised image accordingly. Alternately, threshold values for one or more regression parameters may be used to compare with the obtained regression parameter values such that the monochrome/color judgement can be made in an automated way by the image processing system.

Once the judgement is made, one could opt to process the pixelised image such that a single separation image of the black process color remains, or in other words a conversion to a true monochrome image could be executed. Doing so reduces the size of the pixelised image which is both beneficial with respect to storage capacity as well as processing time in subsequent processing steps. Moreover, the removal of color errors is likely to enhance image quality.

EXAMPLE 2

Figure 4A:
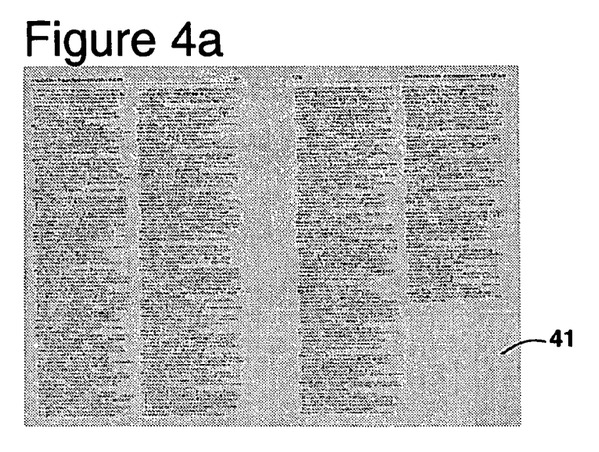
FIG. 4a is an example of a monochrome representation of a black and white text document on a yellowed paper background.
Figure 4B:
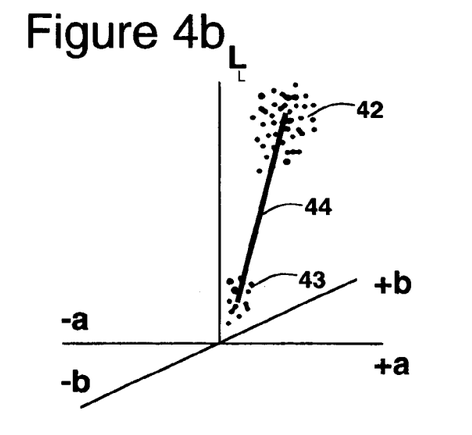
FIG. 4b is a representation of the pixelised text document of FIG. 4a in the CIE L*a*b* color space.

An original, such as a black and white text document on a paper background as depicted in FIG. 4a, is scanned using a color scanner. Originally the paper background was white, but the influence of the sunlight resulted in a yellowed paper background (41). As a result of the color scan, a pixelised image is obtained which is used as input for the pre-processor (4) of the image processing system according to the present invention. The pixelised image is composed of color separation images in the RGB color space. The image signals associated with the respective separation images are converted to image signals associated with the CIE L*a*b* color space. In FIG. 4b, all pixels of FIG. 4a are represented in the CIE L*a*b* color space. As can be observed in FIG. 4b, there are two clusters of pixels: a white-yellow cluster (42) composed of the background pixels, and a black cluster (43) composed of the text characters. The gray axis (44) is determined by the pre-processor (4) as the straight line connecting the black point and the white point and is clearly different from the ideal gray axis. The white point is obtained by averaging the pixels of the white-yellow cluster (42), while the black point is obtained by averaging the pixels of the black cluster (43). Subsequently the analyser (3) can calculate for each pixel the shortest distance to the gray axis (44). For all pixels, the logarithm of the cumulative pixel count versus the distance to the gray axis can subsequently be plotted in a cumulative histogram. Although not shown, the result (generally linear) is comparable with the histogram obtained in Example 1 above as depicted in FIG. 3c. In this Example 2, the judgement is therefore again monochrome.

Figure 4C:
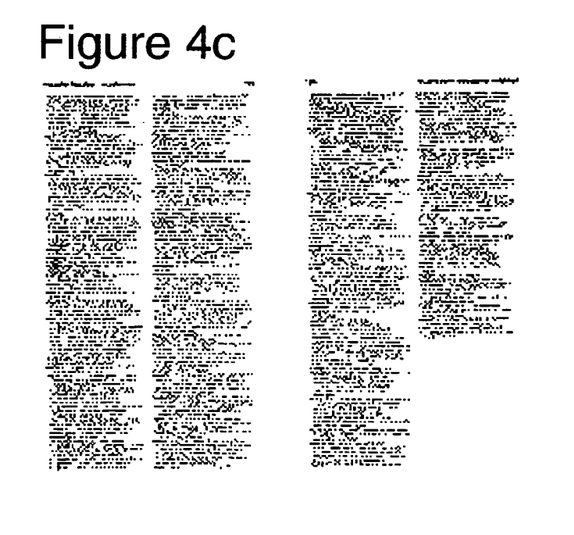
FIG. 4c is a reproduction of the black and white text document of FIG. 4a after background correction by translating and rotating the gray axis of the pixelised image.

Once this judgement is made, one could opt to process the pixelised image such that the gray axis coincides with the ideal gray axis (i.e. the luminance axis) by subjecting the pixels to at least a rotation and translation step. The result hereof is depicted in FIG. 4c. One could even opt to include a monochrome/black-and-white judgement once it is established that the pixelised image is not a color image. Once it is established that the image is a true black-and-white image, i.e., without gray levels, one could opt to process the pixelised image such that a conversion to a true black-and-white image is executed. Doing so even further reduces the size of the pixelised image as only a single bit per pixel is required instead of 8-bits in case of a monochrome or 24-bits in case of a color image.

EXAMPLE 3

Figure 5A:
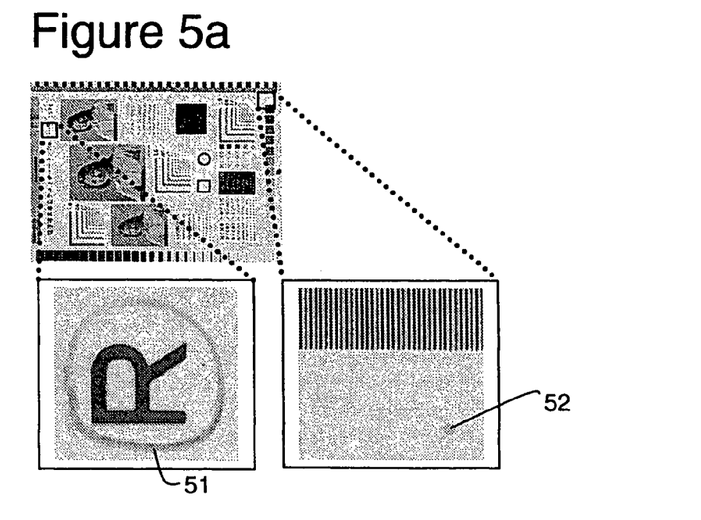
FIG. 5a is an example of a monochrome representation of a monochrome document including some small color objects.
Figure 5B:
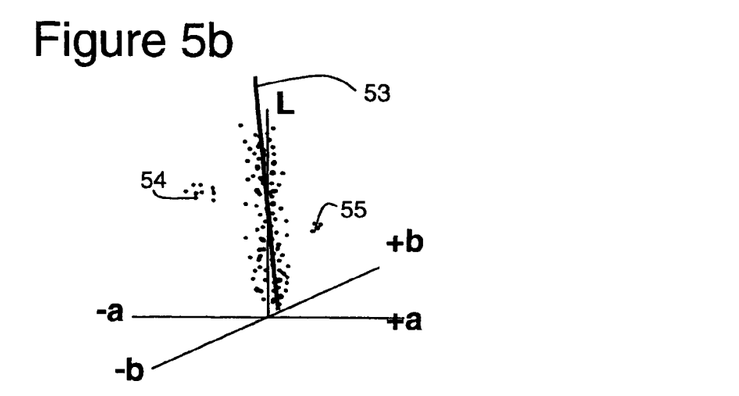
FIG. 5b is a representation of the pixelised document of FIG. 5a in the CIE L*a*b* color space.

An original, such as a monochrome document with a very small amount of color, as depicted in FIG. 5a, is scanned using a color scanner. The document includes two small color objects: a green circle (51) to highlight a character, and some brown coffee spots (52) formed by spilling coffee on the document. As a result of the color scan, a pixelised image is obtained which is used as input for the pre-processor (4) of the image processing system according to the present invention. The pixelised image is composed of color separation images in the RGB color space. The image signals associated with the respective separation images are converted to image signals associated with the CIE L*a*b* color space. In FIG. 5b all pixels of FIG. 5a are represented in the CIE L*a*b* color space. As can be observed in FIG. 5b, there are two small clusters of color pixels: a cluster (54) composed of the pixels of the green color object (51), and a cluster (55) composed of the pixels of the brown color object (51). The pre-processor (4) determines the equation of the gray axis (53) which almost coincides with the ideal gray axis.

Figure 5C:
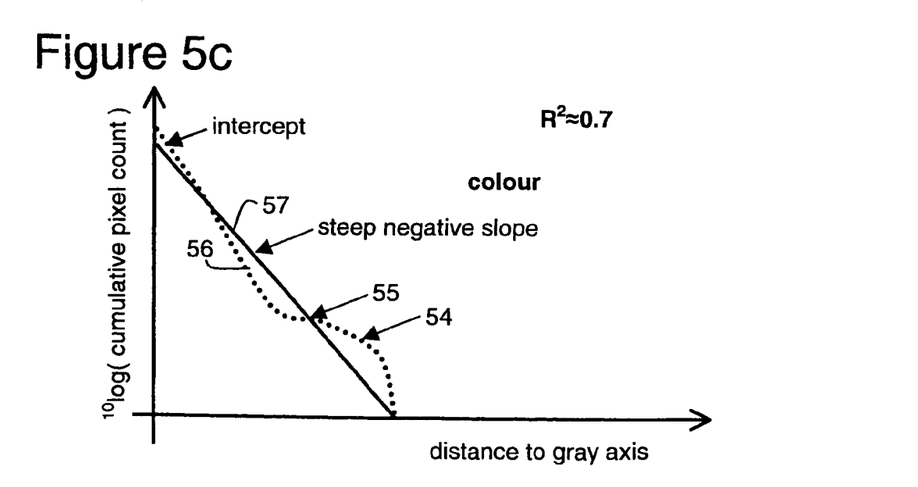
FIG. 5c is a cumulative histogram of the pixelised document of FIG. 5a according to an embodiment of the invention.

Subsequently the analyzer (3) calculates for each pixel the shortest distance to the gray axis. For all pixels, the logarithm of the cumulative pixel count (56) versus the distance to the gray axis is plotted in the cumulative histogram as depicted in FIG. 5c. As can be seen in this cumulative histogram, the brown cluster (55) and the green cluster (54) are not linear and clearly visualized demonstrating the sensitivity of the image processing system according to the present invention to detect small amounts of color. The image is therefore judged to be in color. This is confirmed by the linear regression analysis yielding a regression curve (57) with a coefficient of determination ($R^2$) equal to about 0.7. The slope of the regression line is still steep while the value of the intercept is lowered. Particularly, a threshold value for the coefficient of determination ($R^2$) may be used to compare with the obtained value such that the monochrome/color judgement is made in an automated way by the image processing system.

In this example it is questionable whether one wishes to treat the colored objects as color or not in further processing steps. Therefore after the color recognition, one could further process the data in order to determine whether the color in the image is functional or not. This can be done by the user/operator or in an automated way using a rule base. Such a system is disclosed in co-pending European Patent Application No. 02077078.0 (filing date of May 27, 2002).

EXAMPLE 4

Figure 6A:
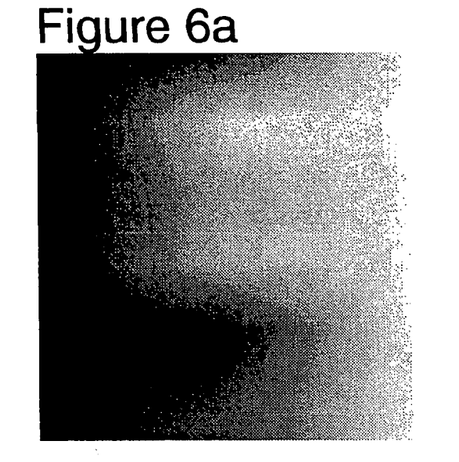
FIG. 6a is an example of a monochrome representation of a full color picture.
Figure 6B:
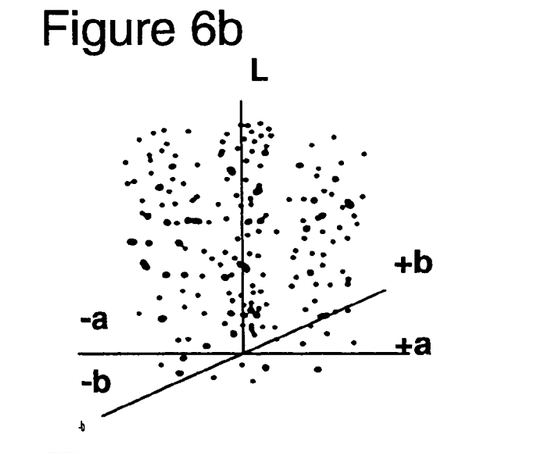
FIG. 6b is a representation of the pixelised picture of FIG. 6a in the CIE L*a*b* color space.

An original, in casu a color picture, which is depicted in FIG. 6a as a monochrome picture, is scanned using a color scanner. The document includes all kinds of colors distributed over the entire color space. As a result of the color scan, a pixelised image is obtained which is used as input for the pre-processor (4) of the image processing system according to the present invention. The pixelised image is composed of color separation images in the RGB color space. The image signals associated with the respective separation images are converted to image signals associated with the CIE L*a*b* color space. In FIG. 6b, all pixels of FIG. 6a are represented in the CIE L*a*b* color space. As can be observed in FIG. 6b, there the pre-processor (4) determines the equation of the gray axis which almost coincides with the ideal gray axis.

Figure 6C:
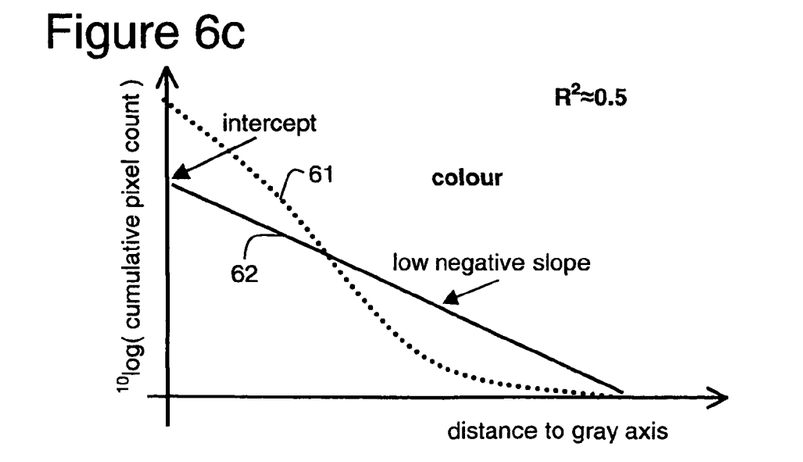
FIG. 6c is a cumulative histogram of the pixelised picture of FIG. 6a according to an embodiment of the invention.

Subsequently the analyser (3) calculates for each pixel the shortest distance to the gray axis. For all pixels, the logarithm of the cumulative pixel count (61) versus the distance to the gray axis is plotted in the cumulative histogram as depicted in FIG. 6c. As can be seen in this cumulative histogram, there is no linear relation between the logarithm of the cumulative pixel count and the distance to the gray axis. The image is therefore judged to be a color image. This is confirmed by the linear regression analysis yielding a regression curve (62) with a coefficient of determination ($R^2$) equal to about 0.5. The slope of the regression line is low and the value of the intercept is also low. These are all indications that the pixelised image is a color pixelised image.

The operator may perform the color/monochrome judgement himself and process pixelised image accordingly. Alternately, threshold values for one or more regression parameters may be used to compare with the obtained regression parameter values such that the monochrome/color judgement can be made in an automated way by the image processing system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An image processing method for processing a pixelised image, the method comprising the steps of:
    analyzing pixel data representative of said pixelised image in a color space and based thereon, determining a gray axis defined as a straight line connecting a white point with a black point;
    determining for each pixel of said pixelised image a shortest distance to said gray axis;
    forming a cumulative histogram by plotting for the pixels of said pixelised image a value of said shortest distance versus a cumulative pixel count being the number of associated pixels having at least said value of said shortest distance; and
    analyzing a relationship between the pixels in said cumulative histogram and based thereon judging whether said pixelised image is to be processed as a monochrome image or a color image.

2. The method as recited in claim 1, wherein in the step of analyzing the relationship between the pixels in said cumulative histogram, only the pixels of said cumulative histogram having an associated cumulative pixel count value equal to or greater than a predetermined threshold are taken into account.

3. The method as recited in claim 1, wherein in the step of analyzing a relationship between the pixels in said cumulative histogram, the relationship between the pixels in said cumulative histogram is determined by applying a linear regression analysis to said pixels in said cumulative histogram.

4. The method as recited in claim 3, wherein the step of judging whether said pixelised image is to be processed as a monochrome image or a color image is based on a result of comparing a value of at least one regression parameter with a predetermined threshold value of said at least one regression parameter.

5. The method as recited in claim 4, wherein said at least one regression parameter is selected from a group of parameters comprising:
    a correlation coefficient (R),
    a coefficient of determination ($R^2$),
    a slope of a regression line, and
    an intercept of the regression line.

6. The method as recited in claim 1, further comprising the step of:
    converting said pixel data representative of said pixelised image in said color space to pixel data representative of said pixelised image in a CIE color space.

7. The method as recited in claim 1, wherein the judging step judges based on whether or not there is a linear relationship between the value of said shortest distance and the cumulative pixel count for the pixels of said pixelised image.

8. The method as recited in claim 7, wherein the judging step judges whether said pixelised image is a monochrome image if the linear relationship exists.

9. The method as recited in claim 7, wherein the judging step judges that said pixelised image is a color image if the linear relationship does not exist.

10. An image processing system for processing a pixelised image, the system comprising:
    a pre-processor for analyzing pixel data representative of said pixelised image in a color space and based thereon determining a gray axis defined as a straight line connecting a white point with a black point, and determining for each pixel of said pixelised image the shortest distance to said gray axis;

an analyzer for analyzing a relationship between the pixels of said pixelised image in a cumulative histogram, said cumulative histogram being formed by plotting for the pixels of said pixelised image a value of said shortest distance versus a cumulative pixel count being the number of associated pixels having at least said value of said shortest distance; and a judging unit for judging, based on said relationship between the pixels in said cumulative histogram, whether said pixelised image is to be processed as a monochrome image or a color image.

11. The system as recited in claim 10, further comprising:

a fitting unit wherein the relationship between the pixels in said cumulative histogram is determined by applying a linear regression analysis to said pixels in said cumulative histogram.

12. The system as recited in claim 10, further comprising:

a converter for converting said pixel data representative of said pixelised image in said color space to pixel data representative of said pixelised image in a CIE color space.

13. The system as recited in claim 10, wherein the analyzer takes into account only the pixels of said cumulative histogram having an associated cumulative pixel count value equal to or greater than a predetermined threshold.

14. The system as recited in claim 10, wherein the judging unit judges based on a result of comparing a value of at least one regression parameter with a predetermined threshold value of said at least one regression parameter.

15. The system as recited in claim 14, wherein said at least one regression parameter is selected from a group of parameters comprising:

a correlation coefficient (R), a coefficient of determination ($R^2$), a slope of a regression line, and an intercept of the regression line.

16. The system as recited in claim 10, wherein the judging unit judges based on whether or not there is a linear relationship between the value of said shortest distance and the cumulative pixel count for the pixels of said pixelised image.

17. The system as recited in claim 16, wherein the judging unit judges that said pixelised image is a monochrome image if the linear relationship exists.

18. The system as recited in claim 16, wherein the judging step judges that said pixelised image is a color image if the linear relationship does not exist.

19. The system as recited in claim 10, further comprising:

a scanner to scan an original image to provide said pixelised image.

* * * * *